(12) United States Patent
Gross et al.

(10) Patent No.: US 7,855,007 B2
(45) Date of Patent: Dec. 21, 2010

(54) BATTERY ASSEMBLY INCLUDING AN ELECTROLYTE MANAGEMENT SYSTEM

(75) Inventors: Oliver J. Gross, Oxford, MI (US); Jozef Gorog, Troy, MI (US)

(73) Assignee: Cobasys, LLC., Orion, MI (US)

( * ) Notice: Subject to any disclaimer, the term of this patent is extended or adjusted under 35 U.S.C. 154(b) by 503 days.

(21) Appl. No.: 11/820,272

(22) Filed: Jun. 19, 2007

(65) Prior Publication Data
US 2008/0318117 A1    Dec. 25, 2008

(51) Int. Cl.
  *H01M 2/12*    (2006.01)
(52) U.S. Cl. .......................... 429/82; 429/89; 429/149; 429/153; 429/163
(58) Field of Classification Search .................. 429/82, 429/89, 153, 149, 163
See application file for complete search history.

(56) References Cited

U.S. PATENT DOCUMENTS

2005/0208369 A1    9/2005  Puhlick et al.

FOREIGN PATENT DOCUMENTS

| DE | 4242661 | 4/1994 |
|----|---------|--------|
| FR | 1277752 | 12/1961 |

OTHER PUBLICATIONS

Notification of Transmittal of the International Search Report and the Written Opinion of the International Searching Authority, or the Declaration for PCT/US2008/066541 filed Nov. 6, 2008; 6 Pages.

*Primary Examiner*—Jane Rhee

(57) ABSTRACT

A battery assembly may include a battery and a battery housing. The battery may include an electrolyte vent to provide a pressurized electrolyte discharge during an electrolyte discharge event. The battery housing may contain the battery and may include an electrolyte control member to dissipate energy from and inhibit dispersion of the pressurized electrolyte discharge from the electrolyte vent during the electrolyte discharge event.

24 Claims, 5 Drawing Sheets

BATTERY ASSEMBLY INCLUDING AN ELECTROLYTE MANAGEMENT SYSTEM

FIELD

The present disclosure relates to battery assemblies, and more particularly to electrolyte management systems for battery assemblies.

BACKGROUND

The statements in this section merely provide background information related to the present disclosure and may not constitute prior art.

Battery assemblies may include a housing assembly having a battery contained therein. Batteries such as lithium-ion batteries and nickel metal hydride (NiMH) batteries may include electrolyte vents for release of pressurized electrolyte discharge during an electrolyte discharge event. Housing assemblies may include an opening to atmosphere to vent the pressurized electrolyte discharge from the batteries.

SUMMARY

Accordingly, a battery assembly may include a battery and a battery housing. The battery may include an electrolyte vent to provide a pressurized electrolyte discharge during an electrolyte discharge event. The battery housing may contain the battery and may include an electrolyte control member to dissipate energy from and inhibit dispersion of the pressurized electrolyte discharge from the electrolyte vent during the electrolyte discharge event.

A method of electrolyte management for a battery assembly may include providing a flow path for a pressurized electrolyte discharge from a battery within a battery housing and obstructing the flow path within the battery housing to dissipate energy from and limit a dispersion rate of the pressurized electrolyte discharge.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
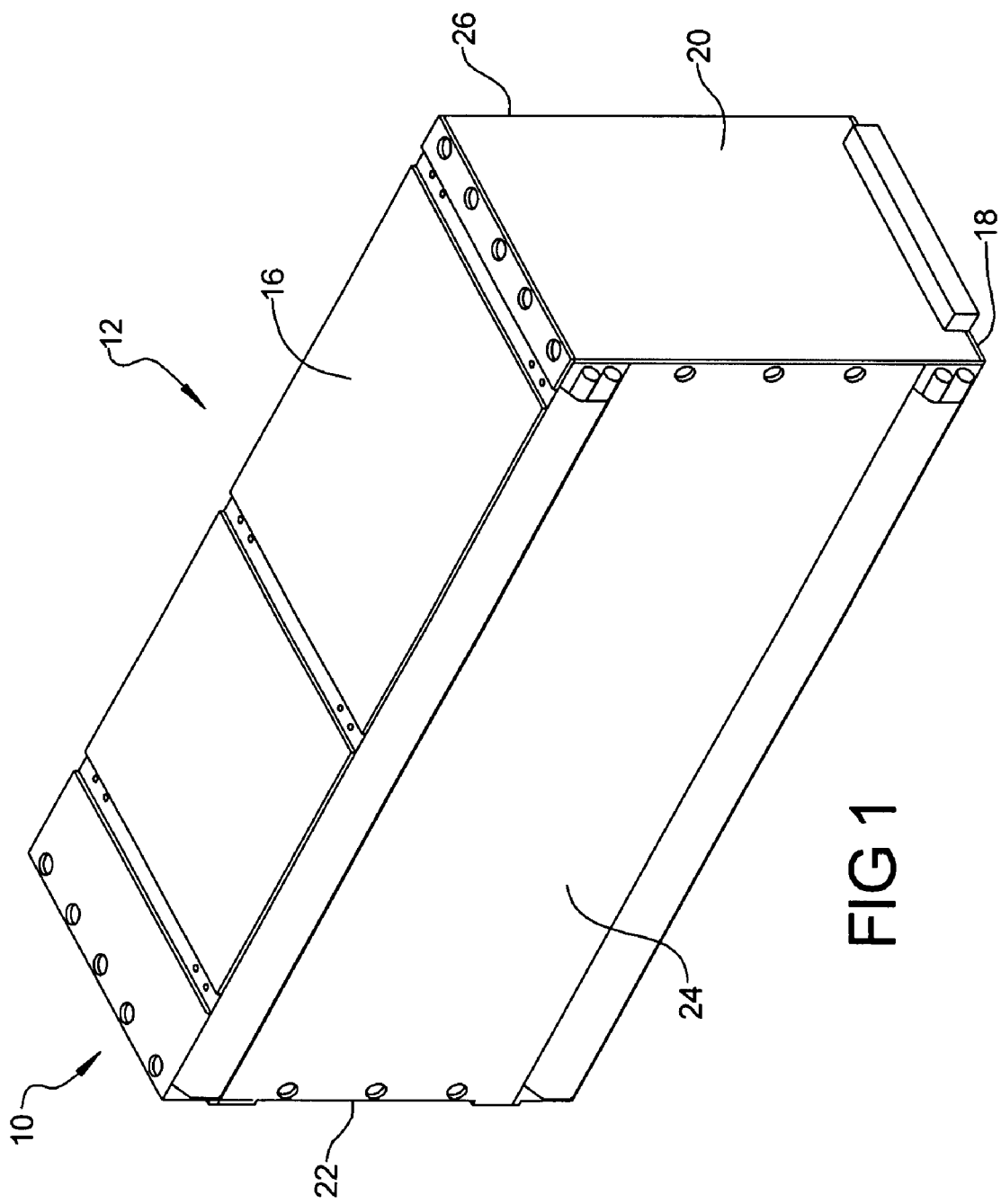
FIG. 1 is a perspective view of a battery assembly according to the present disclosure.
Figure 2:
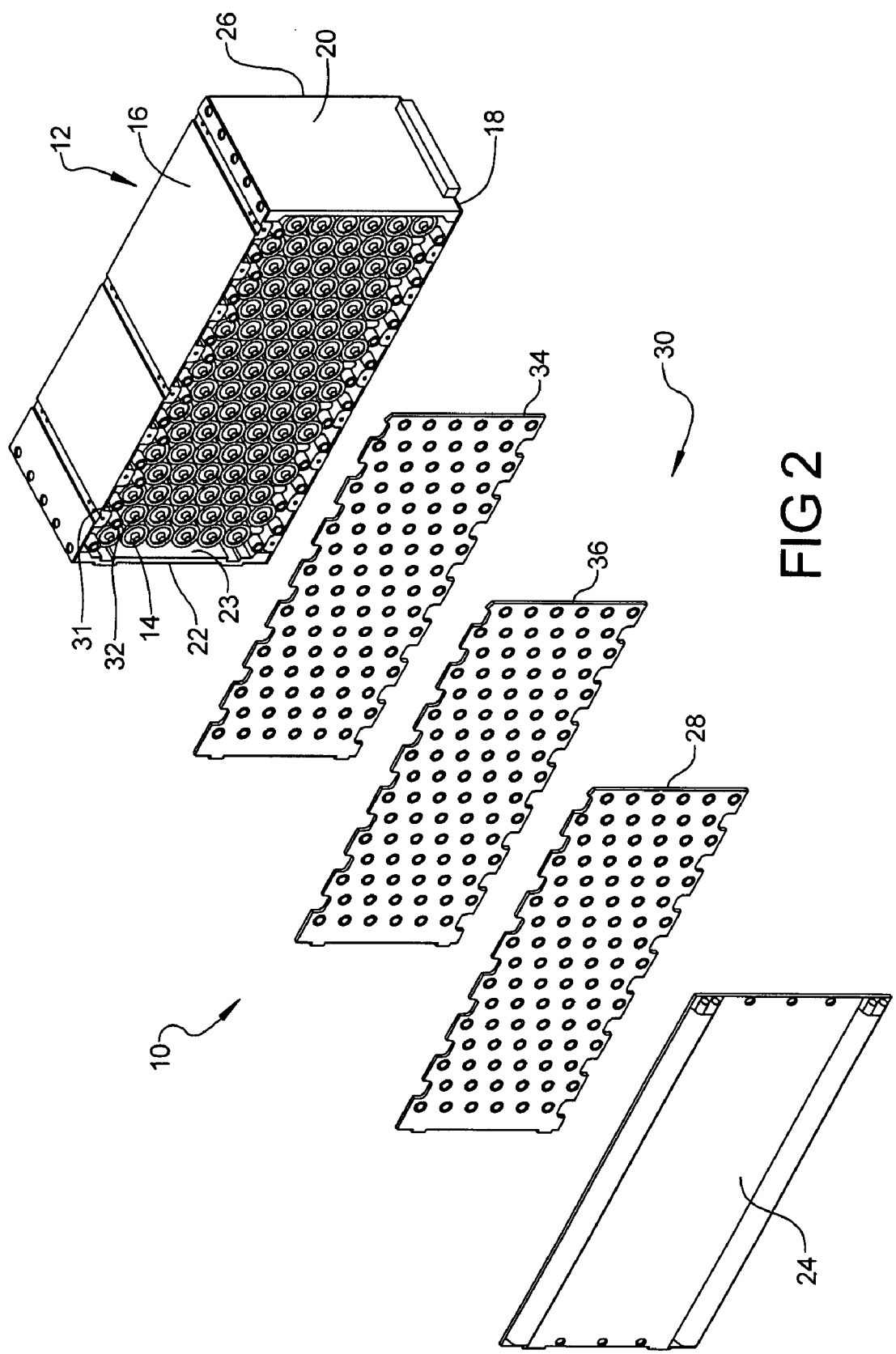
FIG. 2 is a partially exploded perspective view of the battery assembly of FIG. 1.

With reference to FIGS. 1 and 2, a battery assembly 10 may include a housing assembly 12 containing a plurality of batteries 14 therein. Housing assembly 12 may include upper and lower wall members 16, 18, side walls 20, 22, front and rear cover members 24, 26, first and second terminal boards 28 (second not shown), and first and second electrolyte control members 30 (second not shown). Upper and lower wall members 16, 18 and side walls 20, 22 may generally define a battery compartment 23. For simplicity, front cover member 24, first terminal board 28, and first electrolyte control member 30 will be described below, with the understanding that the description applies equally to rear cover member 26, second terminal board, and second electrolyte control member. Housing assembly 12 may further include a series of battery modules 31 containing batteries 14 therein.

Housing assembly 12 may enclose battery modules 31, and therefore batteries 14 therein. Front cover member 24, first terminal board 28, and electrolyte control member 30 may overly an end 32 of batteries 14, as discussed below. More specifically, first terminal board 28 may be disposed between front cover member 24 and electrolyte control member 30. Electrolyte control member 30 may be disposed between cover member 24 and battery compartment 23. More specifically, electrolyte control member 30 may be disposed between end 32 of batteries 14 and first terminal board 28, as discussed below. Electrolyte control member 30 may be coupled to an inner surface of first terminal board 28.

While first and second terminal boards 28 are included in FIG. 2 to provide electrical communication with batteries 14, it is understood that terminal bars (not shown) may be used as well. In an arrangement using terminal bars, first and second terminal boards 28 may be removed from housing assembly 12 and electrolyte control member 30 may be disposed between front cover member 24 and end 32 of batteries 14. Electrolyte control member 30 may be coupled to front cover member 24.

Electrolyte control member 30 may include first and second layers 34, 36. First layer 34 may be an electrolyte permeable layer and second layer 36 may be an electrolyte absorbent layer. First layer 34 may be disposed between second layer 36 and end 32 of batteries 14. Second layer 36 may be disposed between first terminal board 28 and first layer 34 or between front cover member 24 and first layer 34 in a system where first terminal board 28 is not used. First layer 34 may act as a diffusion layer to slow the electrolyte discharge and second layer 36 may act as an absorptive layer to absorb the electrolyte discharge.

First layer 34 may be formed from a variety of structures and materials permeable to an electrolyte discharge from battery 14. For example, first layer 34 may be formed from a polymeric fiber structure and may have a thickness of approximately 1.0 mm. Materials used for the polymeric fiber may include polyesters, polyimides, polyetherimide, and nylon. First layer 34 may be formed from a material capable of withstanding pressures greater than 150 psi without suffering changes to the gas transmission properties thereof. Additionally, first layer 34 may have a dielectric value greater than 500 Mohm/m. First layer 34 may also be able to withstand temperatures up to 200 degrees Celsius, and more specifically, temperatures between 130 and 180 degrees Celsius.

Second layer 36 may be formed from a variety of structures and materials capable of absorbing an electrolyte discharge from battery 14 and may be slightly thicker than first layer 34. For example, second layer 36 may have a thickness of approximately 1.5 mm, or 1.5 times the thickness of first layer 34. Second layer 36 may be formed from a polypropylene, Nylon 6-6, polyethylene, or polyester (PET) material. Second layer 36 may be formed from a material capable of withstanding pressures greater than 150 psi without suffering changes to the absorptive properties thereof. Additionally, second layer 36 may have a dielectric value greater than 500 Mohm/m. Second layer 36 may also be able to withstand temperatures up to 200 degrees Celsius, and more specifically, temperatures between 130 and 180 degrees Celsius.

While described as including first and second layers 34, 36, it is understood that electrolyte control member 30 may be formed as a single member having the properties of both first and second layers 34, 36. Alternatively, a single one of first and second layers 34, 36 may be used. Electrolyte control member 30 is discussed further below with respect to FIG. 5.

Figure 3:
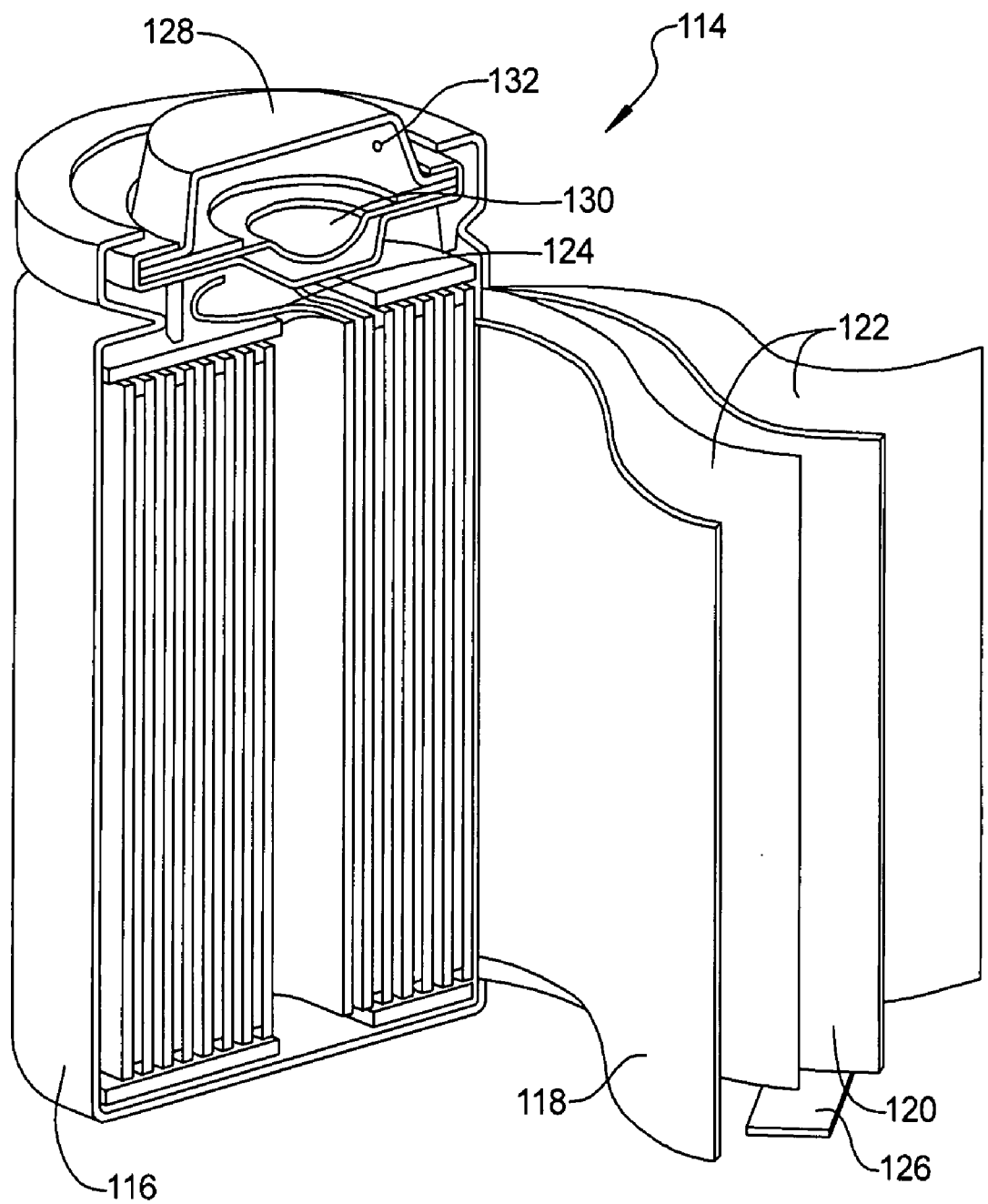
FIG. 3 is a schematic illustration of a first battery for the battery assembly of FIG. 1.
Figure 4:
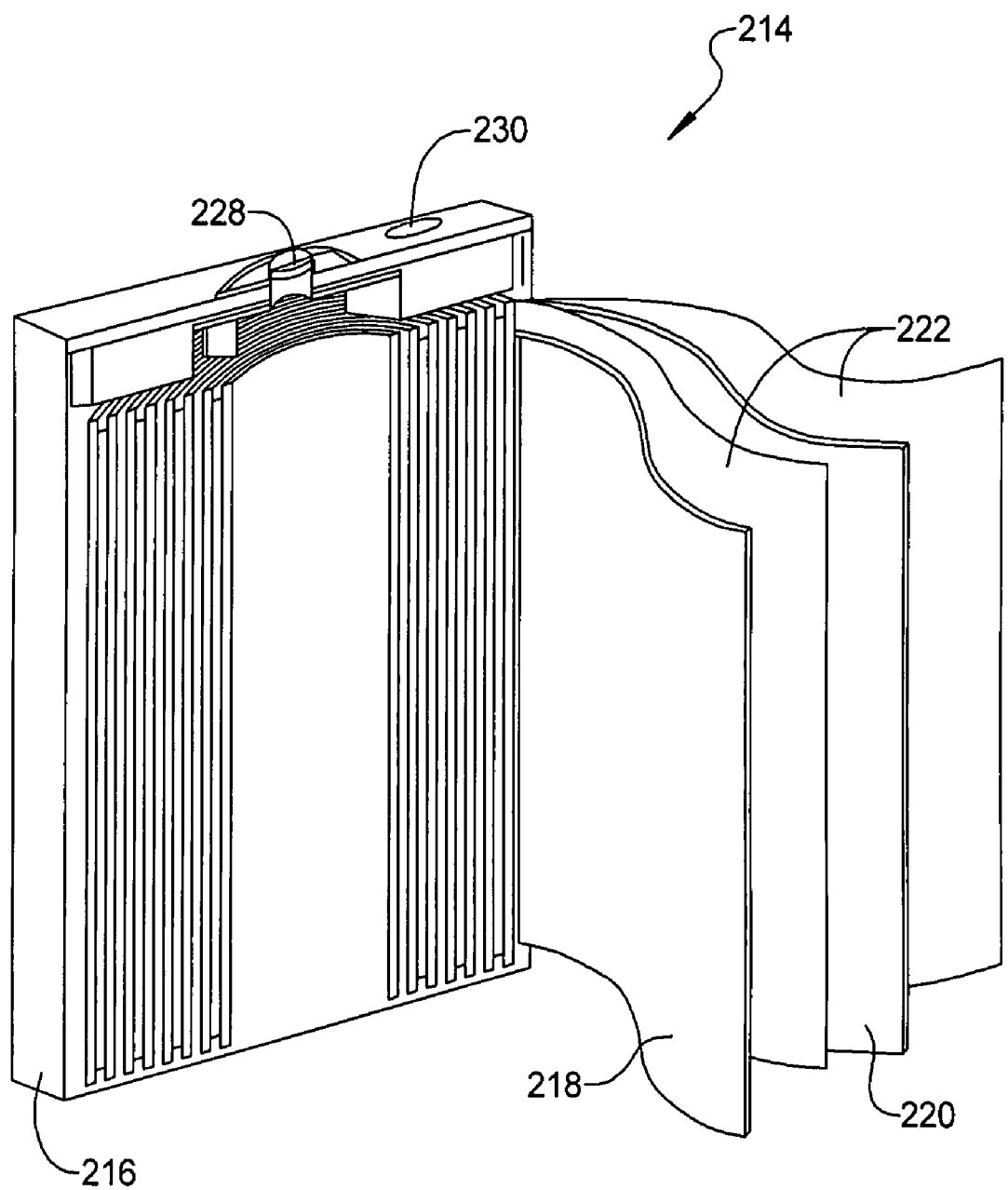
FIG. 4 is a schematic illustration of a second battery according to the present disclosure.

Batteries 14 may include lithium-ion batteries and nickel metal hydride (NiMH) batteries. Batteries 14 may include cylindrical lithium-ion batteries 114 (FIG. 3) and prismatic lithium-ion batteries 214 (FIG. 4). While housing assembly 12 is shown housing batteries 14 that are generally similar to cylindrical lithium-ion batteries 114, it is understood that an alternate housing assembly (not shown) that is generally similar to housing assembly 12 may be used for prismatic lithium-ion battery 214 or NiMH batteries.

Cylindrical lithium-ion battery 114 may include a generally cylindrical casing 116 housing a positive electrode 118, a negative electrode 120, and a separator 122 submerged in an organic solvent that acts as an electrolyte. The organic solvent may include ethyl methyl carbonate. Positive electrode 118, negative electrode 120, and separator 122 may be in the form of sheets pressed together to form a spiral wrap. Cylindrical lithium-ion battery 114 may further include positive and negative tabs 124, 126. Positive tab 124 may be engaged with a positive cap 128 at a first end of cylindrical casing 116 and negative tab 126 may be engaged with an end of cylindrical casing 116 generally opposite positive cap 128. A gas release vent 130 may be disposed between positive cap 128 and the electrolyte. A vent passage 132 may be located in positive cap 128 to provide for escape of the electrolyte if gas release vent 130 is caused to open.

Prismatic lithium-ion battery 214 may include a generally rectangular casing 216 housing a positive electrode 218, a negative electrode 220, and a separator 222 submerged in an organic solvent that acts as an electrolyte. The organic solvent may include ethyl methyl carbonate. Positive electrode 218, negative electrode 220, and separator 222 may be in the form of sheets pressed together to form a spiral wrap. Prismatic lithium-ion battery 214 may further include a negative cap 228 at a first end of rectangular casing 216. A gas release vent 230 may be disposed adjacent negative cap 228. Gas release vent 230 may form a vent passage to provide for escape of the electrolyte if prismatic lithium-ion battery 214 fails.

Figure 5:
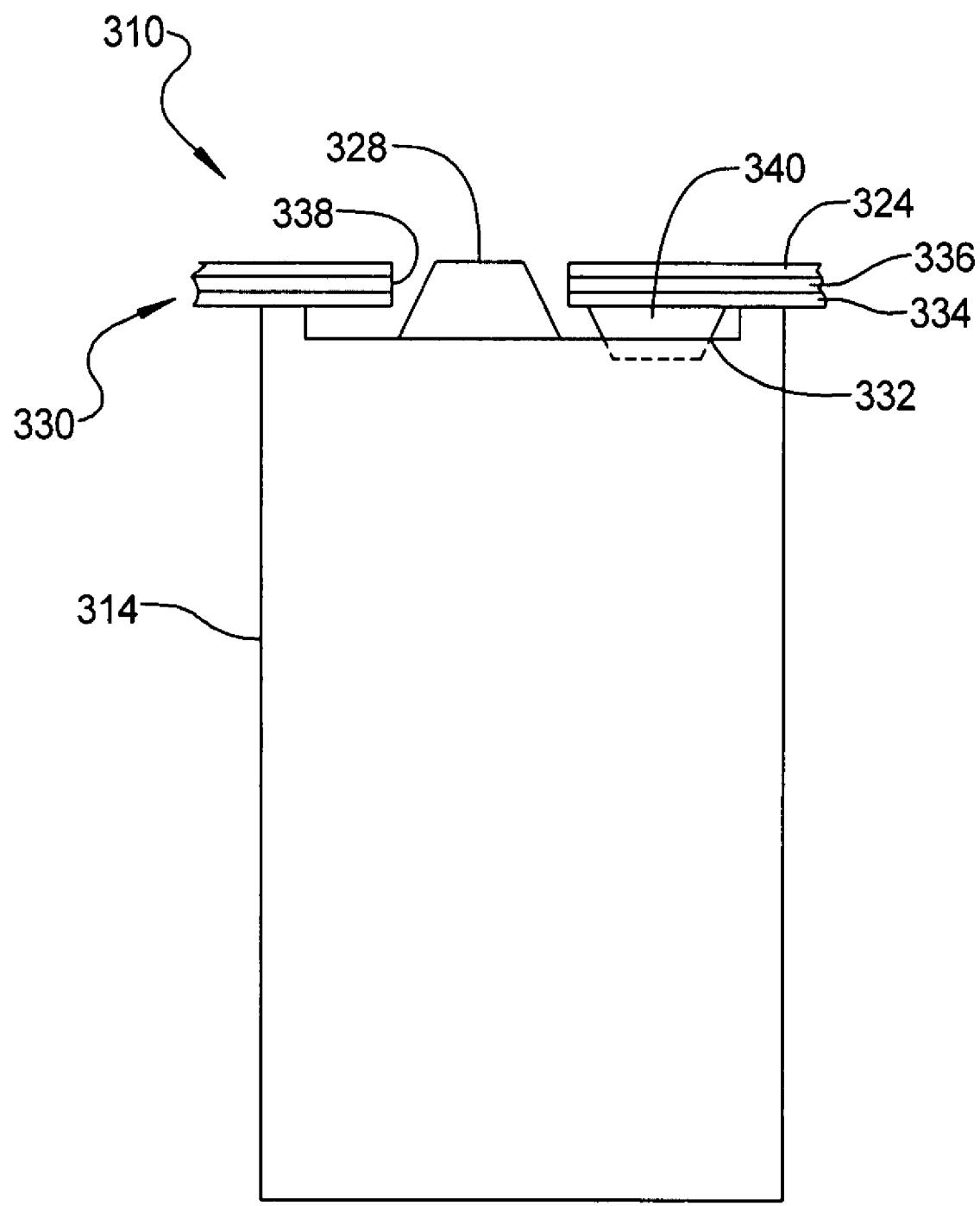
FIG. 5 is a schematic illustration of a battery assembly according to the present disclosure.

A battery assembly 310 is schematically shown in FIG. 5 for illustration purposes. Battery assembly 310 is generally a schematic illustration of battery assembly 10. The schematic illustration may generally apply to cylindrical lithium-ion battery 114, prismatic lithium-ion battery 214, or any other lithium-ion, NiMH, or other battery including a vent passage to release a pressurized electrolyte discharge.

Battery assembly 310 may generally include a battery 314, a cover member 324, and an electrolyte control member 330. Battery 314 may be a lithium-ion battery or a NiMH battery, as discussed above. Cover member 324 may include a housing cover, a terminal board, or a combination thereof. Electrolyte control member 330 may overly battery 314 and may generally be disposed between battery 314 and cover member 324.

Battery 314 may include a terminal cap 328 (positive or negative) and a gas release vent 332. Terminal cap 328 may extend through an opening 338 in electrolyte control member 330. Gas release vent 332 may generally face electrolyte control member 330. More specifically, electrolyte control member 330 may be positioned such that it is generally normal to a discharge flow path from gas release vent 332. Electrolyte control member 330 may include first and second layers 334, 336. First layer 334 may generally correspond to first layer 34 and second layer 336 may be generally correspond to second layer 36, as discussed above. Therefore, it is understood that the above description applies equally to first and second layers 334, 336.

During a failure (an electrolyte discharge event) of battery 314, a pressurized electrolyte discharge 340 may be expelled from within battery 314 in the form of an aerosol. First layer 334 may generally diffuse electrolyte discharge 340. Diffusion of the electrolyte discharge 340 may generally inhibit dispersion of electrolyte discharge 340 by dissipating the energy thereof. Second layer 336 may absorb the electrolyte discharge 340 passing through first layer 334. Second layer 336 may further inhibit dispersion of electrolyte discharge 340 by containing electrolyte discharge 340 through absorption thereof. As indicated above, it is understood that first and second layers 334, 336 may be used in combination, individually, or a single layer may be used having the properties of both first and second layers 334, 336.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, the specification and the following claims.

What is claimed is:

1. A battery assembly comprising:
   a battery compartment that includes a plurality of batteries, wherein said plurality of batteries includes a battery;
   a cover member extending over said battery compartment and said plurality of batteries; and
   an electrolyte control member disposed between said battery compartment and said cover member to cover an electrolyte vent of said battery to dissipate energy from and inhibit dispersion of a pressurized electrolyte discharge from the electrolyte vent during an electrolyte discharge event.

2. The battery assembly of claim 1, wherein said electrolyte control member includes an electrolyte permeable layer that is permeable to the electrolyte discharge to dissipate energy from the electrolyte discharge.

3. The battery assembly of claim 2, wherein said electrolyte permeable layer includes a polymeric fiber structure.

4. The battery assembly of claim 1, wherein said electrolyte control member includes an electrolyte absorption layer to contain the electrolyte discharge.

5. The battery assembly of claim 4, wherein said electrolyte absorption layer includes a polypropylene structure.

6. The battery assembly of claim 4, wherein said electrolyte control member includes an electrolyte permeable layer that is permeable to the electrolyte discharge to dissipate energy from the electrolyte discharge, said electrolyte permeable layer being disposed between said electrolyte absorption layer and the electrolyte vent.

7. The battery assembly of claim 1, further comprising a lithium-ion battery disposed in said battery compartment and including an electrolyte vent.

8. The battery assembly of claim 1, wherein said electrolyte control member is fixed to said cover member.

9. The battery assembly of claim 1, wherein said cover member includes a terminal board to provide electrical communication with the battery, said electrolyte control member disposed between said terminal board and the electrolyte vent.

10. A battery assembly comprising:
a battery including an electrolyte vent to provide a pressurized electrolyte discharge during an electrolyte discharge event; and
a battery housing containing a plurality of batteries including said battery, wherein said battery housing includes (i) an electrolyte control member to dissipate energy from and inhibit dispersion of the pressurized electrolyte discharge from said electrolyte vent during the electrolyte discharge event and (ii) a cover member that extends over said plurality of batteries.

11. The battery assembly of claim 10, wherein said electrolyte control member includes an electrolyte permeable layer that is permeable to the electrolyte discharge to dissipate energy from the electrolyte discharge.

12. The battery assembly of claim 10, wherein said electrolyte control member includes an electrolyte absorption layer to contain the electrolyte discharge.

13. The battery assembly of claim 12, wherein said electrolyte control member includes an electrolyte permeable layer that is permeable to the electrolyte discharge to dissipate energy from the electrolyte discharge, said electrolyte permeable layer being disposed between said electrolyte absorption layer and said electrolyte vent.

14. The battery assembly of claim 10, wherein said battery housing includes said cover member extending over said electrolyte vent, said electrolyte control member being disposed between said cover member and said electrolyte vent.

15. The battery assembly of claim 14, wherein said electrolyte control member is fixed to said cover member.

16. The battery assembly of claim 14, wherein said cover member includes a terminal board to provide electrical communication between said battery housing and said battery, said electrolyte control member being disposed between said terminal board and said electrolyte vent.

17. The battery assembly of claim 14, wherein said battery includes a lithium-ion battery.

18. A method comprising:
providing a flow path for a pressurized electrolyte discharge from a battery within a battery housing; and
obstructing the flow path between said battery and said battery housing to dissipate energy from and limit a dispersion rate of the pressurized electrolyte discharge, wherein said battery housing includes a cover member and a plurality of batteries including said battery, and
wherein said cover member extends over said plurality of batteries.

19. The method of claim 18, wherein said obstructing includes dissipating energy from the electrolyte discharge using an electrolyte permeable material disposed in the flow path.

20. The method of claim 18, wherein said obstructing includes absorbing the electrolyte discharge using an electrolyte absorbent material.

21. The method of claim 20, wherein said obstructing includes dissipating energy from the electrolyte discharge using an electrolyte permeable material disposed in the flow path before said absorbing.

22. The method of claim 18, wherein said providing includes providing a flow path for a pressurized electrolyte discharge from a lithium-ion battery.

23. The battery assembly of claim 1, further comprising a terminal board disposed between said cover member and said electrolyte control member, wherein:
said plurality of batteries comprise respective casings with a plurality of positive ends and a plurality of negative ends;
said a plurality of positive ends communicate with respective positive electrodes of said plurality of batteries;
said a plurality of negative ends communicate with respective negative electrodes of said plurality of batteries; and
one of said plurality of positive ends and said plurality of negative ends communicates with said terminal board.

24. The battery assembly of claim 1, wherein said electrolyte control member dissipates energy from and inhibits dispersion of pressurized electrolyte discharges from electrolyte vents of said plurality of batteries.

* * * * *

UNITED STATES PATENT AND TRADEMARK OFFICE
CERTIFICATE OF CORRECTION

| | | |
|---|---|---|
| PATENT NO. | : 7,855,007 B2 | |
| APPLICATION NO. | : 11/820272 | |
| DATED | : December 21, 2010 | |
| INVENTOR(S) | : Gross et al. | |

It is certified that error appears in the above-identified patent and that said Letters Patent is hereby corrected as shown below:

Column 2, Line 17         Delete "overly" and insert --overlie--
Column 3, Line 61         Delete "overly" and insert --overlie--

Signed and Sealed this
Twenty-second Day of March, 2011

David J. Kappos
*Director of the United States Patent and Trademark Office*